United States Patent [19]

Satterthwaite et al.

[11] Patent Number: 4,661,714

[45] Date of Patent: Apr. 28, 1987

[54] ELECTRIC MARINE PROPULSION SYSTEM

[76] Inventors: J. Glenn Satterthwaite, 4408 Point West Dr., Portsmouth, Va. 23703; George B. Field, Jr., 8425 Larkspur Rd., Richmond, Va. 23235

[21] Appl. No.: 745,175

[22] Filed: Jun. 17, 1985

[51] Int. Cl.$^4$ ............................................. H02P 5/46
[52] U.S. Cl. ..................................... 290/4 R; 318/67
[58] Field of Search ............. 290/4 R, 4 A, 4 B, 4 C; 307/18, 38, 42; 318/51, 66, 67, 82, 112

[56] References Cited

U.S. PATENT DOCUMENTS

| | | | |
|---|---|---|---|
| 3,047,724 | 7/1962 | Neufville et al. | 290/4 R |
| 3,206,664 | 9/1965 | Lilly | 290/4 R |
| 3,543,518 | 12/1970 | Shibata | 290/4 R |
| 3,579,086 | 5/1971 | Lebenbaum | 321/60 |
| 3,600,655 | 8/1971 | Karlin et al. | 318/67 |
| 4,270,072 | 5/1981 | Weber | 318/51 X |

OTHER PUBLICATIONS

H. W. O'Brien, Jr., "SCR Controlled Electric Propulsion System", 32 pages, Apr. 1, 1977.

Primary Examiner—William M. Shoop, Jr.
Assistant Examiner—W. E. Duncanson, Jr.
Attorney, Agent, or Firm—Pollock, Vande Sande & Priddy

[57] ABSTRACT

An AC marine propulsion system which provides a constant continuous rated horsepower availability at the standard rated engine RPM, over the full useful operating range of the propeller. A prime mover diesel engine is operated at its continuous rated speed to provide for maximum fuel efficiency. An alternator connected to the prime mover is driven at a speed which is higher than the standard rated alternator speed, thus producing higher than standard rated voltage and frequency. The combination of prime mover and alternator provides for an optimum system mass to power ratio. An AC motor is coupled through a gearbox to a fixed pitch propeller system. A frequency converter is dispsoed between the alternator and AC motor. Propeller RPM is controlled by changing the frequency of the voltage supplied to the AC motor. Variable shaft RPM at constant horsepower output is supplied to a fixed pitch propeller by selectively varying the frequency of the voltage supplied by the converter from 100% of maximum RPM to 40% of maximum RPM at 100% shaft horsepower.

14 Claims, 2 Drawing Figures

ELECTRIC MARINE PROPULSION SYSTEM

BACKGROUND OF THE INVENTION

The present invention relates to electric marine propulsion systems. Specifically, an AC electric motor drive is provided for a fixed pitch propeller wherein full power is available at variable shaft RPM and torque.

Marine propulsion systems are of two basic types with regard to the structural design of the propeller. The first basic type is a propeller of "fixed pitch", usually solid cast, wherein the propeller RPM is controlled to comply with the demands of the system. Electric motor drives for fixed pitch propellers are described in various references, including U.S. Pat. No. 4,114,555, and in a paper entitled "SCR Controlled Electric Propulsion System" by Harry W. O'Brien, Jr., delivered at the spring meeting of the Society of Naval Architects and Marine Engineers in New Orleans, La. on Apr. 1, 1977. These referenced systems generate alternating current, and subsequently convert the AC current to DC for driving a DC motor. The prime mover driving the alternator is usually a diesel engine operated at a governed speed, which can produce maximum horsepower upon demand. As such, the prime mover is operated at its continuous rated speed to produce, upon demand, its rated horsepower output. These systems typically control motor RPM by varying the applied DC voltage through the use of an SCR controller. As such, the variable DC voltage supplied to the motor determines the propeller shaft RPM and shaft horsepower, as required. The DC motor is usually coupled to the propeller shaft through a reduction gear box.

The foregoing referenced electric propulsion system provides for control of propeller shaft RPM over a first and second operating speed range, thus producing constant torque up to 100% of base power and shaft RPM, and a variable reducing torque, at 100% of base power, while operating at a shaft RPM above base RPM. The horsepower output of the propulsion system also varies proportionately with changes in shaft RPM up to 100% of base power, thus providing a variable horsepower, constant torque system, up to 100% of base power and shaft RPM. A constant horsepower reducing torque system is provided once full horsepower output at 100% of base horsepower is attained at the top of the first range of operational RPM, wherein horsepower remains constant during operation of the vessel, from the bottom to the top of the second range of operational RPM. The foregoing electric propulsion system is extremely expensive and is inherently burdened with a large mass to power ratio.

Al alternative to the fixed pitch propeller, DC electric drive is the non-electric controllable pitch propeller drive, usually of precision machined fabricated design, which provides the availability of full engine horsepower at a constant propeller shaft RPM. During operation of a controllable pitch propulsion system, the engine can maintain its full horsepower and RPM while complying with the system's various load demands by increasing or decreasing the pitch of the propeller. The advantage of the controllable pitch propeller system is a fully mechanical power train, with the ability to maintain 100% full horsepower while operating under the various load conditions experienced during operation of the vessel.

The controllable pitch propulsion system, however, incurs proportionately excessive frictional drag losses when operating under low pitch, high slip conditions, which diminish the overall propulsive efficiency of the propeller system. As the pitch of the propeller is reduced while shaft RPM and power remain constant, the horsepower which is sacrificed to overcome frictional drag losses becomes very large, when compared to the greatly reduced frictional drag loss of a fixed pitch propeller capable of operating at much lower RPM, while still maintaining full engine RPM and horsepower output. The present invention combines the advantages realized in controllable pitch propulsion systems with those realized in DC or AC-DC electric propulsion systems, while eliminating their respective disadvantages. The system of the invention can provide a constant horsepower output to a fixed pitch propeller over a wide range of shaft RPM to affect a variable torque system which substantially reduces propeller frictional drag losses while operating at low shaft RPM, full power and high propeller slip. The electric propulsion system of this invention provides substantially 100% horsepower over the full useful RPM range of the propeller, while maintaining optimum utilization of the available horsepower.

SUMMARY OF THE INVENTION

It is an object of this invention to provide a marine propulsion system which produces a variable torque propeller drive, utilizing constant horsepower over a wide range of shaft RPM.

It is a more specific object of this invention to provide a totally alternating current marine propulsion system which drives a propeller, such system having a minimum mass to power ratio compared to other electric propulsion systems.

It is a principal object of this invention to provide a variable torque propulsion drive system, which is capable of producing a more ideal balance between frictional and induced propeller drag losses at high slip ratios, which minimizes total drag losses and enhances the propulsive efficiency of the system by at least 5% over other types of propulsion systems.

These and other objects are provided by the marine propulsion system in accordance with the invention.

The propulsion system in accordance with the present invention, converts prime mover internal combustion engine power output into an alternating current.

Typically, the prime mover is a diesel engine operated at its continuous rated RPM to provide for continuous rated horsepower upon demand. This operating condition for the prime mover produces its maximum efficiency for fuel consumption. An alternator is driven by the diesel engine at a rotational speed which produces a voltage and frequency greater than the rated voltage and frequency for the alternator. Thus, the prime mover operating at its continuous rated speed, in conjunction with an alternator driven so as to produce a voltage and frequency higher than its rated voltage and frequency, becomes a major system operative parameter. The generated voltage from the alternator at higher than standard voltage and frequency, provides the operative voltage for running an AC main propulsion motor.

The higher than standard frequency is converted to any selected frequency using frequency conversion apparatus, and applied to an AC motor. The motor is subsequently coupled by reduction gear means to the propeller shaft having a fixed pitch propeller attached to its outboard end.

The propulsion system, in accordance with the present invention, makes it possible to achieve a constant engine horsepower and RPM at maximum fuel efficiency, while changing the propeller RPM to attain an improved propulsion efficiency. Motor RPM is easily changed by changing the output voltage frequency of the conversion apparatus. When it is desirable to maintain a constant horsepower output at increased propeller loads, propeller shaft torque is inversely proportional to the shaft RPM.

Optimum energy conversion is provided with the present invention by maintaining the prime mover at its continuous rated speed, while permitting the alternator to assume an operating RPM, higher than its standard rated RPM. As such, the prime mover need not be oversized so as to compensate for the diminished horsepower output often realized, when driving an alternator at the alternator's standard rated rotational speed. Thus, a minimum system mass to power ratio is achieved.

During operation of the propulsion system of this invention, the fixed pitch propeller will be rotated at variable RPM as selected by the frequency converter. The fixed pitch propeller will, however, absorb less total drag losses at high slip than a conventional controllable pitch propulsion system, and the increased torque at reduced RPM will more efficiently handle the increases experienced in propeller loads.

DESCRIPTION OF THE PREFERRED EMBODIMENT

Figure 1:
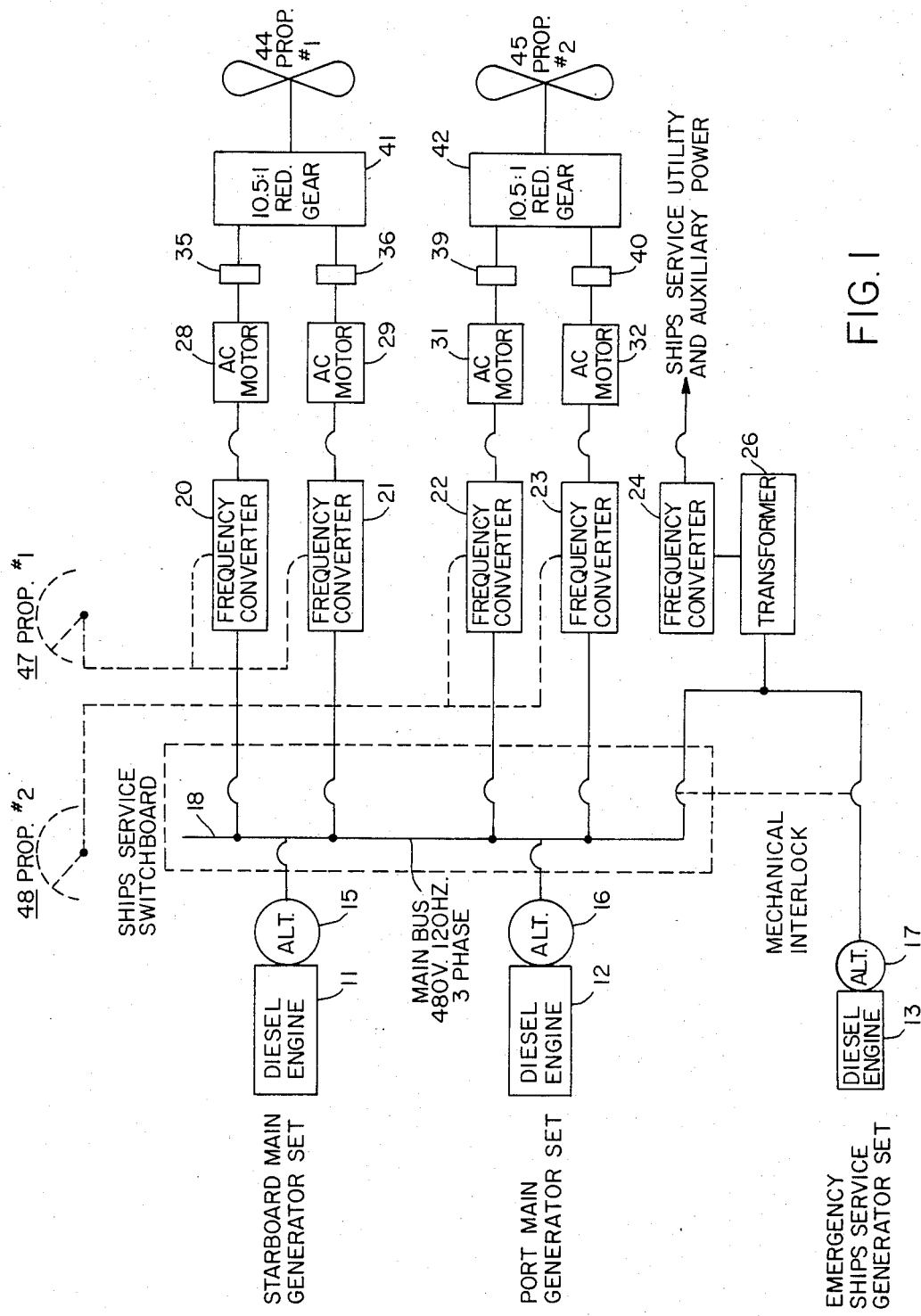
FIG. 1 is an overall block diagram of a propulsion system in accordance with the preferred embodiment.

Referring to FIG. 1, there is shown a block diagram of a propulsion system in accordance with one embodiment of the invention. The embodiment depicted in FIG. 1 is a twin screw marine vessel, having separate power controls 47, 48 for each propeller 44 and 45. The propulsion system provides for a constant horsepower variable torque drive to each propeller.

The twin screw propulsion system of FIG. 1 includes first and second diesel engine prime movers 11 and 12. The diesel engines 11 and 12 are preferably Model 16 V149T1, General Motor diesel engines, each having a continuous rated SHP of 1500 at 1800 RPM. The engines 11 and 12 are operated at a constant speed of 1800 RPM as set by a governor included with the engine.

A third smaller size engine 13 is shown which is employed for emergency shipboard power. The diesel engine 13 will drive alternator 17 to provide converted shipboard utility power at 60 cycles.

Alternators 15 and 16 may be standard rated at 530 kw., 60 Hz.- 8 pole, 240 volts having a continuous rated RPM of 900. Alternator 17 may be standard rated at 100 kw., but is otherwise the same as alternators 15 and 16. Alternators 15, 16 and 17 are driven by the diesel engines 11, 12 and 13 at the controlled speed of 1800 RPM, thus producing a higher than standard frequency of approximately 120 Hz. Additionally the voltage output of alternators 15, 16 and 17 will double from 240 to 480 volts under these input drive conditions. The kw of the alternators 15, 16 and 17 will also double from 530 to 1060 kw., and from 100 kw. to 200 kw., respectively, but, of course, do not produce an increased current output under these drive conditions.

The foregoing combination of engines 11, 12 and 13 and alternators 15, 16 and 17 provides for a maximum energy conversion from diesel power to electric power at a minimum system mass to power ratio. As such, the diesel engine of this invention may be selected to have a rated horsepower which is optimum, thus permitting the engine to be run at its optimum speed of 1800 RPM. Alternators 15, 16 and 17 are driven at this optimum engine RPM at higher than standard frequency. In the prior art electric power propulsion systems, the alternators 15, 16 and 17 would be driven at their standard rated speed to produce their standard rated voltage and frequency. As such, the prior art devices often impose an inefficiency on the diesel engine prime movers 11, 12 and 13 not incurred by the present invention. Since these prior art systems generate voltage at a standard frequency, the prime mover must always be sized so as to make up for the 25-30% loss in horsepower output normally experienced by running the prime mover at the alternator's standard rated RPM. When running the alternator at higher than its rated RPM so as to match the standard rated RPM of the prime mover, the prime mover of this invention need not suffer any operating loss, while the propulsion system is further enhanced by a proportional increase in alternator kw. output. This relationship between prime mover and alternator which achieves a minimum mass to power ratio is described more fully in our previous patent application, Ser. No. 191,856, filed Feb. 29, 1980, hereby incorporated by reference.

A common bus 18 combines the power output of alternators 15 and 16. The combined alternator outputs of 15 and 16 are, of course, phased together as is known to those skilled in the art, such that the 480 volts at 120 Hz. is maintained. This three-phase power is to be converted through frequency converters 20, 21, 22 and 23 to a range of variable frequency suitable for driving propulsion motors 28, 29, 31 and 32.

This three-phase power also supplies the main shipboard electrical service through the interlock system wherein it is first transformed by transformer 26 to a suitable voltage, and then converted through frequency converter 24 to standard 60 Hz. frequency.

Each of the propellers 44 and 45 is connected by shafting to a reduction gear box 41, 42. The propellers are a conventional solid cast, 4-blade design of approximately 120 inches diameter, with a 92-inch pitch and having a pitch ratio (P/D) of 0.76. The propellers are designed to operate at the full 1,340 SHP, over a range from 171 to 68 RPM. The foregoing propeller specifications are of the type which will satisfy the requirements of a typical riverboat towing vessel. The reduction gear box 41 and 42 is a double pinion reduction gear, designed with a 10.5 to 1 reduction ratio. The gear box design will handle 100% SHP through the full range of 171 down to 68 shaft RPM, with the SHP becoming proportional to the shaft RPM (decreasing) at shaft speeds lower than 68 RPM.

AC motors 28, 29, 31 and 32 are coupled to the input of reduction gear boxes 41 and 42. Coupling members 35, 36, 39 and 40 connect the appropriate motors to the reduction gear boxes 41 and 42. The AC motors may be a four-pole design, sized and rated to produce their full power of 670 horsepower each through an operating range of 1800 RPM down to 720 RPM without excessive heating. The foregoing motors, when operated below 720 RPM or 40% of their maximum RPM, will produce an output horsepower proportional to the reduced operating speed.

Each of the AC motors 28 and 29 or 31 and 32 is supplied a voltage from a respective frequency converter 20, 21, 22 and 23. Frequency converters 20 through 23 receive as an input the higher than standard voltage and frequency of the alternators 15 and 16. Frequency converters 20, 21, 22 and 23 will supply constant voltage at a variable frequency under the control of power controls 47 and 48. Each of the power control panels 47 and 48 is linked to the frequency converters 20 through 23 such that the pilot can independently control the RPM of propellers 44 and 45. Control links 49 and 50 may be electrical cables which will vary the resistance of frequency controlling elements of each frequency converter. Alternatively, mechanical linkage may be utilized to vary those potentiometers shown in U.S. Pat. No. 3,579,086.

The frequency converters 20 through 23 are of a type known as a cyclo-converter, similar to those described in U.S. Pat. No. 3,579,086. The frequency converter employs an oscillator which will reduce the input frequency in proportion to the oscillator frequency. The frequency converter 20 is shown more descriptively in the Patent, hereby incorporated by reference. As such, the control of the propeller is accomplished by changing the frequency of a voltage applied to the AC motor.

Frequency converter 24 is a fixed frequency converter, similar to the aforementioned cyclo-converter described in U.S. Pat. No. 3,579,086. A transformer 26 supplies the frequency converter 24. As such, alternator 17 and diesel engine 13 may be driven at a higher than standard frequency RPM, and the correct 60 cycle voltage will be realized from the frequency converter 24. This resulting, transformed 60-cycle voltage may be distributed throughout the vessel to be utilized as ships service power.

Referring to the aforementioned Patent, there is shown the general layout of a frequency converter for reducing a 120-cycle input voltage to a 60-cycle voltage frequency, and then to a variable frequency voltage from 60 Hz. to 0 Hz. Each of the propellers 44 and 45 are controllable by the aforesaid pilot house controls 47 and 48 which control the frequency of the voltage produced from a respective converter.

Figure 2:
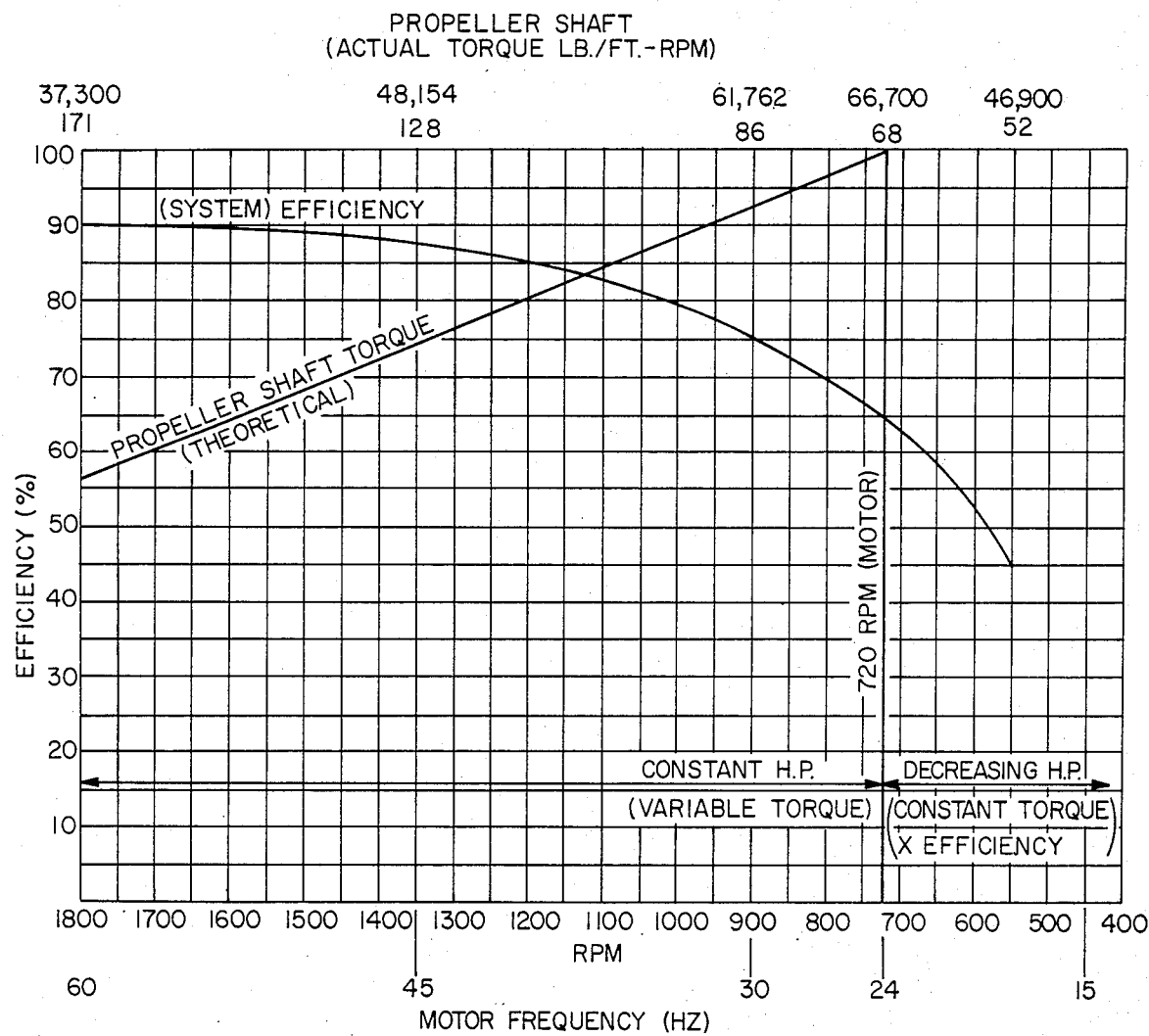
FIG. 2 is a graph demonstrating theoretical system efficiency versus propeller torque.

The performance of the system of FIG. 1 is shown more completely in FIG. 2. FIG. 2 demonstrates the system efficiency for motor input voltage frequencies from 60 to 15 Hz. As is shown to the marine design engineer, a variable torque propulsion system is excellent, if it can provide full power at a maneuvering RPM equal to 50% of its maximum RPM. As such, it is seen that in the 60 Hz. to 24 Hz. operating range of this invention this design criteria is easily met. The entire system efficiency is shown to vary between 90 and 65% over the operating motor frequency of 60 to 24 Hz.

As the motor frequency is varied between 60 Hz. and 24 Hz., the propeller shaft torque is shown to increase while the motor RPM decreases. Although shown as a straight linear change, the propeller shaft torque will, in reality, show a very slight curve between the 60 to 24 Hz. frequency range. However, for all practical purposes, propeller shaft torque may be considered linearly proportional to the RPM and motor frequency.

Over this wide operating range of motor frequency, a constant horsepower output may be applied to the propellers 44, 45. The result of this type of operation can be more clearly shown in the following comparison of the theoretical performance of the present invention over that of a conventional controllable pitch propeller system. As shown in the Table below, the solid cast fixed pitch system produces frictional drag losses which rapidly decrease from maximum RPM to 40% of maximum RPM. Although the induced drag losses increase substantially over the same operating range, in the embodiment of the present invention, the induced drag losses are more than offset by the reduction in frictional drag losses, plus the accompanying increase in torque. As such, the large increase in propeller shaft torque at 100% power constitutes a system efficiency advantage of the present invention over the controllable pitch propeller system.

Thus, one can see that the benefits of a controllable pitch propulsion system are more efficiently realized with the present invention. Full horsepower at increased torque availability is provided over the most important segment of the operating range of the propulsion system. Therefore, optimum vessel speed can be more nearly maintained when an increased load is realized by the vessel. The availability of the full AC system horsepower for varying propeller RPM provides a performance preferable to the controllable pitch propeller propulsion system, and also preferable to the referenced AC/DC constant torque electric propulsion system.

Thus, there has been described with respect to one embodiment of the invention, an AC electric marine propulsion system providing constant horsepower with variable torque to a solid cast fixed pitch propeller. Those skilled in the art will recognize yet other embodiments described by the claims which follow.

COMPARISON BETWEEN TWO PROPULSION SYSTEMS OF EQUAL SHAFT
HORSEPOWER AND PROPELLER SIZE
FIXED PITCH PROPELLER "AC" ELECTRIC SYSTEM, VARIABLE TORQUE
VERSUS
CONTROLLABLE PITCH PROPELLER MECHANICAL SYSTEM, CONSTANT TORQUE

| A<br>Propeller<br>System | B<br>Propeller<br>Shaft HP<br>at 100% | C<br>Propeller<br>RPM at<br>100% Power | D<br>Propeller<br>Pitch (Ratio)<br>at 100% Power | E<br>Propeller<br>Torque at<br>100% Power | F<br>Propeller<br>Slip % | G<br>Fric. Drag<br>Losses % SHP | H<br>Induced<br>Drag (H1)<br>Losses % SHP |
|---|---|---|---|---|---|---|---|
| Fixed Pitch Propeller 'AC' Electric System | 1,340 SHP | Changeable from Max. to 40% of Max. RPM | Fixed Pitch Ratio (P/D) Solid Cast | $\frac{SHP}{RPM}$ Variable = (Increasing) (from Max. RPM to 40% of Max. RPM) | 40% 80% | 25% 10% | 10% 25% (H2) |

-continued

COMPARISON BETWEEN TWO PROPULSION SYSTEMS OF EQUAL SHAFT
HORSEPOWER AND PROPELLER SIZE
FIXED PITCH PROPELLER "AC" ELECTRIC SYSTEM, VARIABLE TORQUE
VERSUS
CONTROLLABLE PITCH PROPELLER MECHANICAL SYSTEM, CONSTANT TORQUE

| A Propeller System | B Propeller Shaft HP at 100% | C Propeller RPM at 100% Power | D Propeller Pitch (Ratio) at 100% Power | E Propeller Torque at 100% Power | F Propeller Slip % | G Fric. Drag Losses % SHP | H Induced Drag (H1) Losses % SHP |
|---|---|---|---|---|---|---|---|
| Controllable Pitch Prop. Mechanical System | 1,340 SHP | Constant at Max. RPM Only | Changeable Pitch Ratio (P/D) Controllable Pitch | $\frac{SHP}{RPM}$ = Constant (Max. RPM only) | 40% 80% | 25% 25% | 10% 15% (H3) |

In the foregoing comparison between a 'Variable' Torque and a 'Constant' Torque system, the "relative" drag losses shown would normally occur, only during conditions such as "maneuvering" operations, or whenever the propeller is subjected to rapid "slip acceleration", or reversal, as in switching from full ahead to full astern, and vice versa. Under these severe (zero to max.), thrust conditions, the Variable Torque system is capable of faster (thrust), recovery, and hence, greater utilization of the available shaft horsepower. Consequently, in a towing operation, it can provide improved "overall" vessel performance.

(H1) Induced drag, is the "rotational" component imparted to the water by the action of the propeller. Propellers of comparatively heavy Pitch-Ratio (P/D), generally produce relatively large 'induced' drags when operating at high slips. On the other hand, propellers of fine Pitch-Ratio (P/D), generally produce relatively small 'induced' drags when operating at high slips.

(H2) The relatively large increase in 'induced' drag at high propeller slip and (comparatively), heavy Pitch-Ratio (P/D), is accompanyed by a similar increase in torque. The increase in 'induced' drag is however, off-set by a similar decrease in frictional drag. This even exchange of drag losses, leaves all of the increased torque available to handle the increased load (increased slip and thrust), without any further sacrifice of power, or speed of advance.

(H3) The relatively small increase in 'induced' drag at high propeller slip and (comparatively), fine Pitch-Ratio (P/D), is accompanied by constant torque. The small increase in 'induced' drag is, however, in addition to the maximum frictional drag. The additional drag losses, require that a further reduction be made in propeller pitch (controlable), to satisfy the additional sacrifice of useful power and subsequent lower speed of advance. Although the 'slip' of the Controlable Pitch propeller may be the same as the Fixed Pitch propeller, the resultant thrust and speed of advance will be less, due to the fact, that the "speed of the propeller" (RPM × Pitch), for the CP propeller, has become less than that of the Fixed Pitch propeller.

What is claimed is:

1. A marine propulsion system comprising:
    a diesel engine for providing a continuous rotational shaft horsepower, said diesel engine operated at a speed of maximum efficiency;
    an alternator having a standard rated frequency output for a standard rated input RPM connected to be driven by said diesel engine, said alternator standard rated RPM selected to be less than said generated diesel engine continuous shaft RPM whereby voltage is generated having a higher frequency than said rated standard frequency and said diesel engine and alternator produces a power output at a maximum efficiency;
    a frequency converter connected to receive voltage from said alternator, said frequency converter providing an alternating output voltage having a selectable frequency;
    an AC motor connected to receive a voltage from said frequency converter, said AC motor producing a horsepower output which is constant and a torque proportional to the frequency of said received voltage; and
    gear reduction means for coupling said AC motor and a propeller shaft, whereby said propeller shaft RPM is controlled by said frequency converter output voltage frequency, which may be varied by said frequency converter.

2. The marine propulsion system of claim 1 wherein said alternator is selected to have a rated RPM for producing 60 Hz. voltage which is less than said engine rotational shaft RPM.

3. The marine propulsion system of claim 2 wherein said alternator rated RPM is one half said engine standard rated shaft RPM.

4. The marine propulsion system of claim 1 further comprising a transformer having an input coupled to receive said alternator output voltage, and an output coupled to a second frequency converter for converting the voltage received from said alternator to a frequency of 60 Hz.

5. The marine propulsion system of claim 1 wherein said alternator produces a voltage having a frequency of 120 Hz.

6. A marine propulsion system for independently driving a pair of propeller shafts, comprising:
    first and second diesel engines, each of said diesel engines connected to drive first and second alternators, whereby a pair of diesel generator sets are provided, said diesel engines having a controlled shaft operating speed set to produce maximum shaft horsepower at maximum efficiency, said alternators selected to have a standard rated RPM for producing a standard rated output voltage frequency substantially less than said operating speed, whereby a maximum KW power generation efficiency is obtained at a voltage having a frequency higher than said standard rated output voltage frequency;
    a pair of frequency converters connected to each of said alternators for providing a variable frequency output voltage, said frequency being selected by an operator of said system to control the RPM of said propeller shafts;
    an AC motor connected to each of said alternators, said AC motors providing an output shaft RPM which varies along with torque in response to a varying input voltage frequency while maintaining output shaft horsepower constant; and, a pair of reduction gear transmissions, each coulping a pair of said AC motor shafts to a respective propeller shaft, whereby each of said shafts is driven by a pair of motors at an RPM and torque controlled by selecting the voltage output frequency of said frequency converters.

7. The marine propulsion system of claim 6 wherein said alternators are driven at an RPM to produce an output voltage frequency of two to three times said rated output voltage frequency.

8. The marine propulsion system of claim 6 wherein each of said AC motors is selected to provide full horsepower at an RPM range between 1800 and 720.

9. In a marine propulsion system, a method for driving a solid cast propeller having a fixed pitch comprising:
   coupling an AC motor to said propeller, said AC motor providing a varying torque at varying RPM to said propeller in response to a varying input voltage frequency;
   supplying an AC voltage to said AC motor having a frequency for selecting said AC motor RPM; and
   controlling the frequency of said AC voltage whereby the RPM of said AC motor shaft and coupled propeller is controlled.

10. The method for driving a propeller according to claim 9 wherein said AC voltage is produced in accordance with the steps of:
   driving an alternator having a standard rated RPM which produces 60 Hz voltage with a diesel engine at a speed which produces a maximum diesel engine efficiency whereby said alternator is driven at an RPM to produce a voltage having a frequency substantially higher than 60 Hz.; and,
   frequency converting said alternator voltage to a frequency for obtaining a selected RPM.

11. The method according to claim 10 wherein said alternator RPM is selected to produce a voltage frequency of 120 to 180 Hz.

12. The method according to claim 9 wherein said AC motor is selected to provide full horsepower between an RPM within the range 1800 to 720.

13. A marine propulsion system for providing a variable drive to a constant pitch propeller comprising:
   a diesel engine driven alternator for providing alternating current, said diesel engine operated at a speed of a maximum efficiency, and said alternator producing a current having a frequency higher than its standard rated frequency of operation;
   a frequency converter connected to receive said alternator current having a frequency higher than a standard rated frequency of operation, said converter providing an output voltage at a frequency which is selectable; and
   an AC motor connected to receive said frequency converter output, and coupled to drive said propeller, said AC motor providing a variable rotational speed to said propeller proportional to a selected voltage frequency from said frequency converter, said AC propeller motor providing a constant horsepower for each selected frequency.

14. A marine propulsion system of claim 13 wherein said alternator is driven at a speed to generate voltage and frequency of twice said alternator standard rated voltage and frequency.

* * * * *